United States Patent [19]

Jourquin et al.

[11] Patent Number: 5,656,677

[45] Date of Patent: Aug. 12, 1997

[54] METHOD FOR PREPARING AND APPLYING A SPRAYABLE, LIGHT STABLE POLYURETHANE

[75] Inventors: Lucien Jourquin, Wetteren; Eddie Du Prez, Brakel, both of Belgium

[73] Assignee: Recticel, Sint-Pieters-Woluwe, Belgium

[21] Appl. No.: 485,140

[22] Filed: Jun. 7, 1995

Related U.S. Application Data

[63] Continuation-in-part of Ser. No. 868,090, Apr. 14, 1992, abandoned, which is a continuation of Ser. No. 467,579, Jan. 19, 1990, abandoned.

[30] Foreign Application Priority Data

Jan. 20, 1989 [BE] Belgium .................... 08900067

[51] Int. Cl.$^6$ ............................................. C08J 9/00
[52] U.S. Cl. ..................... 521/126; 521/127; 521/47.5; 528/44; 528/49; 528/52; 528/58; 528/65; 427/421; 427/426
[58] Field of Search .......................... 521/126, 127, 521/47.5; 528/44, 49, 52, 58, 65; 427/426, 421

[56] References Cited

U.S. PATENT DOCUMENTS

| | | |
|---|---|---|
| 3,772,218 | 11/1973 | Lamplugh et al. . |
| 4,150,206 | 4/1979 | Jourquin et al. . |
| 4,292,411 | 9/1981 | Jourquin et al. . |
| 4,517,313 | 5/1985 | Nakatani ................. 521/51 |
| 4,581,387 | 4/1986 | Werner et al. .............. 521/128 |
| 4,695,618 | 9/1987 | Mowrer ..................... 528/55 |
| 4,748,192 | 5/1988 | Smith . |

FOREIGN PATENT DOCUMENTS 2450847  3/1980  France .

Primary Examiner—James J. Seidleck
Assistant Examiner—Duc Troung
Attorney, Agent, or Firm—Sughrue, Mion, Zinn, Macpeak & Seas

[57] ABSTRACT

A method for preparing a light stable polyurethane, sprayable by means of a spray pistol, wherein use is made of an active hydrogen containing compound, wherein the functional groups consist for at least 50% of an active $CH_2OH$, NH and/or $NH_2$ group, the functionality of which varies from 2 to 8 and the equivalent weight of which is comprised between 100 and 3500, together with 2 to 300 parts, per 100 parts of said compounds of a chain extender and/or a cross-linker, the functional groups of which are OH groups, at least 50% of which are primary OH groups, the equivalent weight of which is less than 100 and the functionality of which varies from 2 to 6, and with a catalytic system which comprises at least an organic lead, bismuth and/or tin (IV) compound and at least an amine initiator, having a functionality of 2 to 6, an equivalent weight lower than or equal to 200, and at least one aliphatic $NH_2$ or NH group.

43 Claims, No Drawings

METHOD FOR PREPARING AND APPLYING A SPRAYABLE, LIGHT STABLE POLYURETHANE

This is a Continuation-in-Part of application Ser. No. 07/868,090 filed on Apr. 14, 1992 (abandoned), which is a continuation of prior application Ser. No. 07/467,579 filed Jan. 19, 1990 (abandoned).

A method for preparing a light stable polyurethane, sprayable by means of a spray pistol and having an initial viscosity of 200 to 1200 cps at application temperature, a fibre forming time ("FT") larger than 4 seconds and a demoulding time ("DT") less than 10 minutes, wherein an isocyanate, having at least two NCO groups which are not directly attached to an aromatic group, is made to react with a compound containing active hydrogen with respect to NCO groups, in the presence of a chain extender and/or a cross-linker and possibly a blowing agent.

It is important to notice that chain extenders and cross-linkers form compounds containing also active hydrogen with respect to NCO groups, the equivalent weight (EW) of which is however relatively low.

The main object of the invention is to propose a method which allows to obtain a light stable polyurethane, which is very appropriate for spraying, by means of which a sufficiently thick and homogeneous polyurethane layer can be applied to a surface of an open mould in one single passage or spray process, which is relatively viscous and gels quickly in order to prevent the run off of the material on the mould surface under the influence of the gravity force and the viscosity of which is still sufficiently low in the initial state in order to obtain a homogeneous spreading over the mould surface, and also to prevent clogging of the spray pistol. More particularly, it is important that a too quick gelation does not occur during the spraying so that a homogeneous thickness would be obtained by a sufficient flow of the reactive mixture in the initial reaction stage, somewhat in an analogous manner as it is the case with a paint. Further, the initial viscosity increase may not be too large a.o. in order to prevent deposits on the spray nozzle outlet, which would change the spray pattern. Finally, in order to guarantee a sufficient productivity as to production cycle time, the gelation ("curing") of the reacting mixture and hence the demoulding time has to be as short as possible.

To this end, use is made in the method according to the invention of an active hydrogen containing compound, wherein the functional groups consist for at least 50% of an active $CH_2OH$, NH and/or $NH_2$ group, the functionality of which varies from 2 to 8 and the equivalent weight of which is comprised between 100 and 3500, together with 2 to 300 parts per 100 parts of said compound of a chain extender and/or a cross-linker, the functional groups of which are OH groups, at least 50% of which are primary OH groups, the equivalent weight of which is less than 100 and the functionality of which varies from 2 to 6, and with a catalytic system which comprise at least an organic lead, bismuth and/or tin (IV) compound and at least an amine initiator, having a functionality of 2 to 6, an equivalent weight lower than or equal to 200, and at least one aliphatic $NH_2$ or NH group.

In a particular embodiment of the invention, use is made of a catalytic system comprising at least an amine initiator together with a lead, tin or bismuth compound and (a) a zeolite type catalyst formed of an alkaline aluminium silicate with sodium and/or potassium ions, and/or (b) an alkaline catalyst having a pH higher than 10 and consisting of diazobicyclo-alkenes or salts of the latters with weak organic acids or consisting of potassium, sodium or lithium salt of weak organic acids.

The invention relates also to a method for spraying the light stable polyurethane foam prepared according to the above described method.

This method is characterized by the fact that use is made of a two components system, wherein one component comprises the isocyanate and all of the additives which are stable with respect to this isocyanate during a sufficient time period and also compatible with the latter and wherein the other component comprises the compounds containing active hydrogen with respect to NCO groups, especially polyols, chain extenders and cross-linkers and additives which are stable with respect to these compounds during a sufficient time period and also compatible with the latter.

Other particularities and advantages of the invention will become apparent from the following description of a series of polyurethane formulations which are obtained by applying the method according to the invention and also of some specific embodiments of the method according to which the thus prepared polyurethane is sprayed.

Thus, the present invention provides a method for preparing a light stable substantially non-cellular demouldable polyurethane, sprayable by means of a spray pistol and having an initial viscosity of 200 to 1200 cps at application temperature, a fibre forming time, FT, greater than 3 seconds, and a demoulding time, DT, less than 10 minutes, wherein an isocyanate, having at least two NCO groups which are not directly attached to an aromatic group, is reacted with a compound containing active hydrogen with respect to NCO groups, in the presence of a chain extender and/or cross-linker, wherein the compound containing active hydrogen comprises functional groups which consist of at least 50% of active $CH_2OH$, NH and/or $NH_2$ groups, and has a functionality which varies from 2 to 8 and an equivalent weight between 100 and 3500, but excluding caprolactone polyols having a terminal hydroxyl number higher than 200, together with 2 to 300 parts, per 100 parts of said compound, of a chain extender and/or a cross-linker, the functional groups of which are OH groups, at least 50% of which are primary OH groups, and which has an equivalent weight less than 100 and a functionality which varies from 2 to 6, wherein said reacting is catalyzed with a catalytic system which comprises:

1) at least an organic lead compound of one of the following groups:
   a) organolead (II) salts of carboxylic acids, containing at least one carboxylic group;
   b) lead dithiocarbamates having the formula:

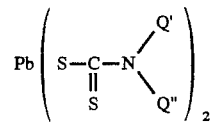

wherein Q' and Q" are different or the same and represent an alkyl group with 1–20 carbon atoms;
   c) organolead (IV) compounds having the formula $PbQ_4'''$, wherein Q''' represents an alkyl group with 1–6 carbon atoms; and
   d) lead (II) acetylacetonate; and/or 2) at least an organic bismuth compound of the following general formula:

$$(R_1)_k-(Bi)_p-(Z)_q-Bi-(R_1)_n$$
$$\mid \qquad \mid$$
$$(Y)_j \qquad (Y)_m$$

wherein:
p=q=0 or 1
k+j=2 or 4 when p=q=1 or
k=j=0 when p=q=0
m+n=3 or 5 when k=j=p=q=0 or
m+n=2 or 4 when p=q=1
m+n≠0, m or n may be equal to 0 but are not, however, simultaneously equal to 0;
$R_1$ is a $C_1$–$C_{12}$ alkyl radical which is substituted or not substituted, a phenyl radical, a $C_5$–$C_6$ cycloalkyl radical or a halogen atom;
Z represents oxygen or sulfur;
Y is a halogen atom, a —O—CO—$R_2$, —O$R_2$, —S$R_2$, $$\begin{array}{c}\diagdown \\ O \\ \diagdown \\ R_3 \\ \diagup \\ O \\ \diagup \end{array} \quad \begin{array}{c}\diagdown \\ S \\ \diagdown \\ R_3 \\ \diagup \\ S \\ \diagup \end{array} \quad \text{or} \quad -N\begin{array}{c} \diagdown R_2 \\ \diagup \\ R_2 \end{array}$$

group wherein $R_2$ represents (1) a $C_1$–$C_{20}$ alkyl radical, a $C_2$–$C_{20}$ alkenyl radical, a $C_5$ or $C_6$ cycloalkyl radical, a phenyl radical, a benzyl radical, which are unsubstituted or substituted by one or more $C_1$–$C_{12}$ alkyl or $C_2$–$C_{12}$ alkenyl radicals, one or more halogen atoms, one or more hydroxy, —OR, —N(R)$_2$ or —SR radicals, or (2) a phenyl radical which is substituted by one or more CHO, —CO—R or COOR groups, R being a $C_1$–$C_{12}$ alkyl, $C_2$–$C_{12}$ alkenyl, $C_5$–$C_6$ cycloalkyl, phenyl, or benzyl radical, which is unsubstituted or substituted by one or more $C_1$–$C_2$ alkyl or $C_2$–$C_{12}$ alkenyl radicals, one or more halogen atoms, or hydroxy radicals, and $R_3$ is a (—C$R_4R_5$)$_x$ group wherein x=2 or 3 and $R_4$ and $R_5$=H, CH$_3$ or $C_2H_5$, and/or 3) at least an organic tin (IV) compound of one of the following groups:
   a) Sn (IV) carboxylates having the following general formula:

$$\begin{array}{c} R_1 \diagdown \\ \diagup Sn \diagdown \\ R_1 \diagup \end{array} \begin{array}{c} O-C-R_2 \\ \parallel \\ O \\ O-C-R_2 \\ \parallel \\ O \end{array}$$

wherein $R_1$ is a $C_1$–$C_4$ alkyl radical and $R_2$ forms a $C_1$–$C_{12}$ alkyl radical or a naphthenic acid radical, the alkyl radicals being linear or branched;
   b) dialkyldistannoxane dicarboxylates having the following general formula:

$$\begin{array}{c} R_1 \diagdown \qquad \qquad \diagup R_1 \\ Sn-O-Sn \\ \diagup \mid \qquad \qquad \mid \diagdown \\ R_1 \; OCOR' \qquad R_1 \\ \mid \\ OCOR' \end{array}$$

wherein $R_1$ is a $C_1$–$C_4$ alkyl radical and R' is a $C_1$–$C_{12}$ branched or unbranched alkyl radical;

c) alkyltin halides having the following general formula:

$(R_1)_x Sn(Hal)_y$ wherein $R_1$ is a $C_1$–$C_4$ alkyl radical, Hal is a halogen, x+y=4 and x or y varies from 1 to 3;
said organic lead, and/or bismuth and/or tin (IV) compound being combined with at least an amine initiator, having a functionality of 2 to 6, an equivalent weight lower than or equal to 200, and at least one aliphatic NH$_2$ or NH group.

Generally, the invention relates to a multiple component polyurethane system which can be sprayed on an open mould or on other surfaces by means of a multicomponent spray nozzle in order to form inherent light stable, flexible, semi-flexible, or rigid, microcellular or not cellular films or layers having a density of 500 to 1200 kg/mL.

These multicomponents comprise the following substances:

a) an isocyanate, the NCO groups of which are not directly attached to an aromatic group, such as aliphatic or alicyclic polyisocyanates or derivatives of these;

b) with respect to the NCO groups active hydrogen containing compounds, especially so-called "basic polyols" containing with respect to NCO groups reactive groups which consist mainly of CH$_2$OH and/or NH and/or NH$_2$ or mixtures thereof, having a functionality between 2 and 8 and an equivalent weight between 100 and 3500 (within the context of this description, there is arbitrarily meant by "basic polyols" all of the here defined compounds);

c) 2 to 300 parts per 100 parts of the "basic polyols", of a chain extender and/or a cross-linker, dependent upon the hardness degree of the foils, having only functional OH groups, at least 50% of which are primary OH groups, the equivalent weight of which is lower than 100 and the functionality of which varies from 2 to 6;

d) a synergic catalytic system comprising at least one compound of each of the next two series:
   1. an organic lead, bismuth or tin compound or mixtures thereof;
   2. one or more amine containing initiators, (functionality ≦2), which in fact also serve as chain extender and/or as cross-linker and which are either or not combined with an alkaline catalyst or zeolite type catalyst, as will be defined further hereinafter;

e) 0 to 0.4% water, present in the active hydrogen containing compounds;

f) possibly low boiling liquids serving as a physical blowing agent and the amount of which is comprised between 0 and 0.04 moles with respect to 100 gr of the active hydrogen containing compounds (b) and (c), the boiling point of these liquids being preferably comprised between 20° and 700° C.

The cross-linkers have a functionality higher than 2, whilst the chain extenders have a functionality of 2. In both cases, the molecular weight is relatively low.

The suitable isocyanates can be very different.

According to a first embodiment of the invention, use can thus be made of an isocyanate consisting mainly of IPDI monomer and/or mixtures of IPDI monomer with IPDI derivatives, such as trimers, more particularly isocyanurates or biuret, prepolymers and/or carbodiimide/urethidion derivatives and this in such proportions that a NCO value of 15 to 37.8 in percent by weight is obtained.

In a second embodiment, the isocyanate consists of TMXDI or derivatives (except from isocyanurate trimer):

prepolymers, biuret trimer and/or carbodiimide/urethidion derivatives, in such proportions that a NCO value of 15 to 3.4 in percent by weight is obtained.

In a third embodiment, the isocyanate is formed of HDI whether or not in combination with derivatives, such as trimers, prepolymers and/or carbodiimide/urethidion derivatives, as in the first embodiment, taking care that the NCO value is anyway finally situated between 15 to 50.

In a fourth embodiment, the isocyanate is formed of H6XDI and possibly of analogeous combinations as is the case in the first hereabove described embodiment in which the NCO value is comprised between 15 and 43.

A fifth embodiment consists in using H12MDI, possibly in combination with derivatives or consisting of prepolymers and/or carbodiimide/urethidion derivatives, the NCO value being comprised between 15 and 31.8.

Generally, also other aliphatic or alicyclic isocyanates or derivatives thereof can be used provided that the following conditions are simultaneously met:

1) functionality of basic monomer=2

2) NCO groups not directly attached to aromatic ring.

The types or mixtures defined in the following Table 1 are preferred.

TABLE 1

| Prepolymer (*) (+ monomer) | Isocyanurate (+ monomer) | Biuret (+ monomer) | % NCO preference (of final mixture) |
|---|---|---|---|
| IPDI | X | X | X | 20–30 |
| TMXDI | X | — | X | 15–30 |
| HDI | X | X | X | 20–35 |
| H6XDI | X | X | X | 20–35 |
| H12MDI | X | X | X | 15–25 |

(*) Preferably but not exclusively, following reactive components (versus NCO) are used for the prepolymerisation of the here described polyisocyanates:
1) Polyetherpolyols, chain extenders/cross-linkers with only sec. and/or primary OH groups as reactive groups and:
Hydroxylnumber: 15–1800
functionality: 2–6 (= number of OH groups per molecule).
2) Polyamines (with primary and/or secondary amino groups) with "sufficient" low reactivity versus NCO groups, in order to allow the preparation of stable, homogeneous prepolymer mixtures in the given % NCO range.
A sufficient low (= moderated) reactivity of the polyamines is obtained for polyamine molecules with:
a sufficient high equivalent weight (= MW/f) or in other words a sufficient high molecular weight (MW) and a sufficient low functionality (f), i.e. for example a functionality of 2 or 3.
The minimum molecular weight, depending on other molecule parameters, will be described further.
and/or sufficient steric hindrance of the sec. NH groups, through substitution with non reactive groups, such as (1) linear alkyl groups ($C_2$–$C_{10}$) substituted by electronegative groups, such as phenyl, cyano, halogen, . . . and (2) branched alkyl groups ($C_4$–$C_{10}$).
A more specific description of such preferred polyamines, which can be subdivised in two general chemical classes, is given hereafter:
a) Polyoxypropylene di- and triamines
(e.g. JEFFAMINE ® types, produced by TEXACO)

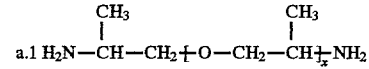
funct.: 2
MW: 400–6000 (equiv. weight: 200–3000)
a.2. id. a.1 but sec. NH—R end groups instead of (more reactive) primary $NH_2$ group.
funct.: 2
MW: 150–6000 (equiv. weight: 75–3000)
R is e.g. cyanoethyl or isohexyl group.

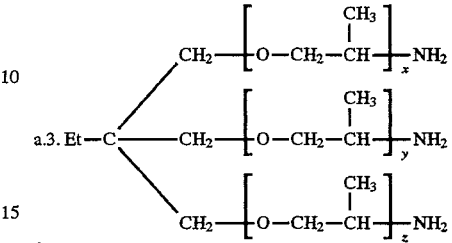
funct.: 3
MW: 900–9000 (equiv. weight: 300–3000)
a.4 id. a.3. but sec. NH—R end groups instead of primary $NH_2$ groups.
funct.: 3
MW: 300–9000 (equiv. weight: 100–3000)
b) Branched alkyl ($C_4$–$C_{10}$) substituted di- or tri-secondary polyamines in MW range of 170–1000
Hereafter some typical (but not limitative) examples:

 (f: 2 - MW: 285)

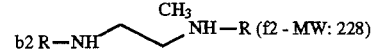 (f2 - MW: 228)

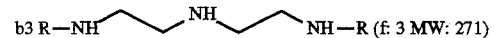 (f: 3 MW: 271)

 (f: 2 MW: 256)

 (f: 2 - MW: 313)

 (f: 2 - MW: 170)

R group in examples b1–b3 is isohexyl

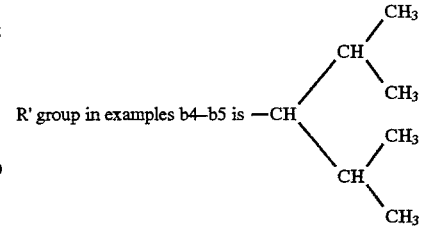

R" group in example b6 is tert. butyl.

It should be remarked that all the above described polyamines can also be directly added in the formulation (through blending into the polyolcompound) i.e. "one-shot" method, instead of through prepolymerisation with the polyisocyanate in a separate step. In case of an equivalent weight $\leq 200$, such molecules, when added by the "one-shot" method, also function as "amine-initiators" (see further), i.e. as a combination of co-catalyst and extender/cross-linker. In case of a functionality of 2, such polyamines will also increase mechanical strength properties, such as elongation and tear resistance.

The NCO index of these different isocyanates comprised in Table 1, representing the stoechiometric ratio between the NCO groups and the active hydrogen containing components, is generally comprised between 80 and 130 and preferably between 85 and 110.

The active hydrogen containing compounds, which are particularly appropriate to react with the isocyanate in order to form polyurethane, preferably consist of "basic polyols" and especially polyoxyalkylene compounds (polyetherpolyols), which are thus formed by polyaddition of propylene oxide and/or ethylene oxide on low molecular starters with OH, NH and/or NH$_2$ groups, which have a functionality of 2 to 8.

These compounds present specifically terminal groups consisting of OH groups, at least 50% of which are primary OH groups, of secondary NH groups and/or of primary NH$_2$ groups.

Table 2 is grouping the polyetherpolyols which are most suitable for applying the invention.

TABLE 2

| TYPE | OH(*) | sec NH and/or prim. NH$_2$ | preferred funct. | preferred equiv. weight = $\frac{MW}{funct.}$ | preferred starters |
|---|---|---|---|---|---|
| 1 | X | — | 2–6 | 100–2500 | polyalcohols |
| 2() | (X) | X | 2–3 | 100–2000 | with f 2–6 and IOH > 800 (*) |

(*): 50% prim. OH (preferably > 70% prim. OH)
(**): Type 2 also known as "JEFFAMINES" (Texaco)
(***): hydroxyl number
(X): possibly present.

Other types of active hydrogen containing compounds are the polyesterpolyols forming ester condensation products of dicarboxylic acids with low molecular polyalcohols having a functionality of 2 to 4, preference being given to polyesterpolyols having a terminal hydroxyl number of 30 to 200 (100% primary OH groups) and a functionality of 2 to 3.

Another group of appropriate compounds active hydrogen containg groups are the polycaprolactone esters with terminal primary OH groups and preferably the ones with a hydroxyl number of 30 to 200 and a functionality of 2 to 4.

A furhter very suitable compound with active hydrogen containing groups are the polytetramethylene ether glycols (PTMG), which are polytetrahydrofuran with 100% primary OH groups, a functionality of 2 and a hydroxyl number of 35 to 200.

Finally, this active hydrogen containing compound can consist of polyols with a functionality of 2 to 3 and a hydroxyl number of 25 to 200, which are further modified with polymerized organic fillers, such as polyols grafted with styrene/acrylonitrile, "PHD" polyols and "PIPA" polyols, the filler content varying between 3 and 50% by weight (see Belgian Patent Application No. 08701053). The polyols of this type which are preferred are the ones having a hydroxyl number of 25 to 35, a functionality of 2 to 3 and a filler content of 5 to 20%.

The used chain extenders and/or cross-linkers can be considered as a special group of the active hydrogen containing compounds and contain only functional OH groups. Moreover, these ones have an equivalent weight of about 30 à 300 and preferably lower than 100. Table 3, given hereafter, shows the concentration of the chain extenders and/or cross-linkers in function of the equivalent weight of the used polyol as active hydrogen containing compound, which allows to obtain optimal results. In this table, the amounts are expressed in parts by weight per 100 parts "basic polyol" (b).

TABLE 3

| | Conc. (parts by weight) | |
|---|---|---|
| Equivalent weight | generally | preferably |
| <500 | 2–30 | 4–25 |
| >500 | 2–300 | 4–150 |

Typical preferred compounds of cross-linkers and chain extenders with only active OH groups having a functionality of 2 to 4, a hydroxyl number higher than 250 and a primary OH group concentration higher than 50% are the next ones: ethylene glycol, propanediol, butanediol, pentanediol, hexanediol, glycerin, trimethylpropane, triethanolamine, trimethylolethane, pentaerythrol, hisphenol A and cyclohexanedimethanol, and also possible addition products of all these examples with less than or equal to 5 moles ethylene oxide and/or propylene oxide per mole chain extender/cross-linker.

The nature of the above mentioned catalysts is further illustrated and described hereafter.

(1) "Pb cat"

These are lead compounds which are already known per se as catalysts for preparing polyurethane with an integral skin. Such catalysts have been described among others in the Dutch Patent Application No. 77,02676.

Thus, usually a compound from one of the following groups is used as organolead compound:

a) organolead (II) salts of carboxylic acids, containing at least one carboxylic group, b) lead dithiocarbamates having formula:

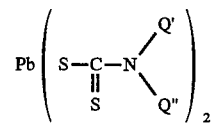

wherein Q' and Q" are different or the same and represent an alkyl group with 1–20 carbon atoms, c) organolead (IV) compounds having the formula PbQ$_4$'", wherein Q'" represents an alkyl group with 1–6 carbon atoms, and d) lead (II) acetylacetonate.

More particularly, there has been determined that amongst these organolead compounds, the following compounds are very suitable:

a) organolead (II) salts of carboxylic acids such as lead acetate, adipate, citrate, 2-ethylhexoate, laurate, linoleate, naphthenate, octanoate, oleate, oxalate, palmitate, resinate, ricinoleate, salicylate, stearate, tallate and tartrate, b) a dithiocarbamate having the formula:

$$Pb\left(S-\underset{\underset{S}{\|}}{C}-N\diagup\substack{Q' \\ Q''}\right)_2$$

wherein Q' and Q" represent methyl, ethyl, butyl or amyl, and c) the compounds having the formula $PbQ_4'''$, wherein Q''' represents methyl or ethyl.

The Pb(II) carboxylates, being lead salts of organic monocarboxylic acids, are particularly preferred.

A typical carboxylic acid is a whether or not branched aliphatic monocarboxylic acid with formula R-COOH, wherein R is an alkyl having 7 to 12 carbon atoms, such as lead-2-ethylhexoate. Another carboxylic acid is naphthenic acid which forms lead naphthenate.

(2) "Bi cat"

Use is made of organic bismuth compounds which are known per se for preparing polyurethane with integral skin, described a.o. in Dutch Patent Application No. 80,01362, for example, a compound of the general formula I:

$$(R_1)_k-(Bi)_p-(Z)_q-\underset{\underset{(Y)_m}{|}}{Bi}-(R_1)_n$$
$$\phantom{(R_1)_k-(Bi)}|$$
$$\phantom{(R_1)_k-(Bi)}(Y)_j$$

wherein:

p=q=0 or 1 k+j=2 or 4 when p=q=1 or k=j=0 when p=q=0 m+n=3 or 5 when k=j=p=q=0 or m+n=2 or 4 when p=q=1 m+n≠0, m or n may possibly be equal to 0 but are not, however, simultaneously equal to 0;

$R_1$ is an alkyl ($C_1$-$C_{12}$) radical which is substituted or not, a phenyl radical, a cycloalkyl ($C_5$-$C_6$) radical or a halogen atom;

Z represents oxygen or sulfur;

Y is a halogen atom, a —O—CO—$R_2$, —$OR_2$, —$SR_2$, $$\diagdown_O\diagup \diagdown_{R_3} \diagup_O \quad \diagdown_S\diagup \diagdown_{R_3} \diagup_S \quad \text{or} \quad -N\diagup^{R_2}_{R_2}$$

group wherein $R_2$ may represent (1) an alkyl ($C_1$-$C_{20}$) radical, an alkenyl ($C_2$-$C_{20}$) radical, a cycloalkyl ($C_5$ or $C_6$) radical, a phenyl radical, a benzyl radical, which are unsubstituted or substituted by one or more alkyl ($C_1$-$C_{12}$) or alkenyl ($C_2$-$C_{12}$) radical, one or more halogen atoms, one or more hydroxy, —OR, —$N(R)_2$ or —SR radicals, or (2) a phenyl radical which is substituted by one or more CHO, —COOR or COOR groups, R being an alkyl ($C_1$-$C_{12}$), alkenyl ($C_2$-$C_{12}$), cycloalkyl ($C_5$-$C_6$), phenyl, or benzyl radical, which is unsubstituted or substituted by one or more alkyl ($C_1$-$C_{12}$) or alkenyl ($C_2$-$C_{12}$) radicals, one or more halogen atoms, or hydroxy radicals, and $R_3$ is a group (—$CR_4R_5$)$_x$ wherein x=2 or 3 and $R_4$ and $R_5$=H, $CH_3$ or $C_2H_5$.

Preference is especially given to three-valency bismuth compounds belonging to the same category as the above described organolead compounds, such as Bi-2-ethylhexoate and Bi-naphthenate.

(3) "Sn cat"

a. Sn(IV) carboxylates

These compounds correspond to following general formula:

$$\substack{R_1 \\ \diagdown \\ \phantom{R}}\substack{\phantom{X} \\ Sn \\ \phantom{X}}\substack{\diagup O-\underset{\underset{O}{\|}}{C}-R_2 \\ \diagdown O-\underset{\underset{O}{\|}}{C}-R_2}$$
$$R_1 \diagup$$

wherein $R_1$ is a ($C_1$-$C_4$) alkyl radical and $R_2$ forms a ($C_1$-$C_{12}$) alkyl radical or a naphthenic acid radical, the alkyl radicals being linear or branched.

Preference being given to compounds wherein $R_1$ is a methyl group and $R_2$ a ($C_7$-$C_{11}$) alkyl radical or a naphthenic acid radical, or also wherein $R_1$ is a butyl group and $R_2$ is a ($C_1$-$C_4$) alkyl radical.

b. Dialkyldistannoxane dicarboxylates

Those compounds have following general formula:

$$\substack{R_1 \\ \diagdown \\ \phantom{X}}\substack{\phantom{X} \\ Sn-O-Sn \\ \phantom{X}}\substack{\diagup R_1 \\ \phantom{X}}$$
$$\substack{\diagup | \\ R_1 \phantom{x} OCOR'}\substack{\diagup | \\ OCOR' \phantom{x} R_1}$$

wherein $R_1$ is a ($C_1$-$C_4$) alkyl radical and R' a ($C_1$-$C_{12}$) whether or not branched alkyl radical.

c. Alkyltinhalides

These compounds have the following general formula:

$$(R_1)_x Sn(Hal)_y$$

wherein $R_1$ is a ($C_1$-$C_4$) alkyl radical, "Hal" is a halogene, preferably chlorine or bromine, x+y=4 and x or y varies from 1 to 3.

(4) "Alkaline cat"

These compounds are strong, alkaline catalysts having a pH larger than 10 and belonging to one or more of the following classes:

a) diazobicyclo-alkenes and salts of these with weak organic acids ($pK_a$>4), having general formula:

$$\substack{\diagup(CH_2)_m\diagdown \\ N-C=N \\ \diagdown(CH_2)_n\diagup} \quad \substack{m=3-7 \\ n=2-4}$$

A typical preference is given to 1,8-diazobicyclo-(5,4,0)-undecene-7 as well as to the octoate or phenolate salt of this compound.

b) K, Na or Li salts of weak organic acids ($pK_a$>4).

A typical preference is given to the octoate, phenolate and oleate salts of K or Na.

(5) "Amine initiators"

Such initiators which are known per se and which can be used in the method according to this invention, are described a.o. in Dutch Patent Applications 77,02676 and 80,01362, provided that a minimum functionality of 2 is required.

Aliphatic or alicyclic alkanolamines or polyamines, having amino group not directly attached to an aromatic ring are generally considered in this respect.

The number of NH and/or NH$_2$ groups is at least 2, if no OH groups are present and, at least 1 if OH groups are present.

The total number of reactive groups, formed by NH, NH$_2$ or OH, mostly varies between 2 and 5.

Typical preferred compounds, notably aliphatic compounds having a functionality of 2 to 4, are the following ones:

monoethanolamine, diethanolamine, diisopropanolamine, ethylenediamine, isophoronediamine, N,N'-dimethyl (diethyl)-ethylenediamine, 2-amino-2-methyl (or ethyl)-1-propanol, 2-amino-1-butanol, 3-amino-1,2-propanediol, 2-amino-2-methyl (ethyl)-1,3-propanediol.

"Jeffamines" (Texaco) (propylene oxide addition products having mainly terminal primary NH$_2$ or secondary NH groups—functionality 2 à 3). Addition products of propylene oxide and/or ethylene oxide on ethylenediamine initiator (2 à 8 moles/mole ethylenediamine).

As mentioned already above the sufficient low reactive polyamines, suitable for the prepolymerization of the polyisocyanates, function also as amine initiators provided their molecular weight is less than 200 and that they are added by "one shot" method, i.e. that they are blended into the polyol compound.

(6) "Zeolite type cat"

These catalysts are alkaline aluminium silicates with Na and/or K ions, wherein the diameter of the micro-cavities is preferably comprised between 2 and 10 Angstrom and typically between 3 and 4 Angstrom and which show the following general formula:

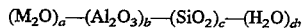

$$(M_2O)_a\text{---}(Al_2O_3)_b\text{---}(SiO_2)_c\text{---}(H_2O)_d,$$

wherein M represents potassium is preferably comprised and/or sodium, beside sodium and/or potassium, also calcium ions can possibly be present.

These silicates can be mixed, as fine powders or as pastes, in liquid dispersion media with the other reaction products for forming polyurethane.

It is important to notice that these zeolites have thereupon an extra possible function, notably the in situ dehydration of the active hydrogen containing compounds, mostly thus the polyols compounds, for example if a maximum density of the obtained polyurethane film, without cellular structure, is desired.

Very suitable catalytic systems, which are applicable according to the invention and which specifically promote the reactions of aliphatic and alicyclic NCO groups with active hydrogen containing compounds, such as OH, NH and NH$_2$ groups, are shown in the following Table 4.

TABLE 4

| Combin. ref. | "Pbcat" (1) | "Bi cat" (2) | "amine initiator" (5) | "Sn cat" (3) | "Zeolite type cat" (6) | "Alkaline cat" (4) |
|---|---|---|---|---|---|---|
| C1 | X | — | X | — | — | — |
| C2 | X | — | X | X | — | — |
| C3 | X | — | X | — | X | — |
| C4 | X | — | X | — | — | X |
| C5–C8 | X | — | X | (X) | (X) | (X) |
| C9 | — | X | X | — | — | — |
| C10 | — | X | X | X | — | — |
| C11 | — | X | X | — | X | — |
| C12 | — | X | X | — | — | X |

TABLE 4-continued

| Combin. ref. | "Pbcat" (1) | "Bi cat" (2) | "amine initiator" (5) | "Sn cat" (3) | "Zeolite type cat" (6) | "Alkaline cat" (4) |
|---|---|---|---|---|---|---|
| C13–C16 | — | X | X | (X) | (X) | (X) |
| C17 | — | — | X | X | X | — |
| C18 | — | — | X | X | — | X |
| C19 | — | — | X | X | X | x |

(X) indicates that at least two of the three catalysts are present. [types (3), (4) and (6)].

An explicite preference is given to the following catalytic combinations: C4, C5, C6, C7, C8, C9, C10, C11, C13, C14, C15, C16 and C18 particularly preferred are C9 and C10.

Recommended concentration ranges of these catalysts are as follows:

Pb catalyst: 0 à 2% and preferably less than 0.5% for reducing or avoiding a metallic lustre and a H2S effect (darkening by contact with H$_2$S as a result of PbS formation);

Bi catalyst: 0 to 2% and preferably less than 1.5% for the technologic processability and heat stability of the final products;

Sn catalyst: 0 to 4% and preferably less than or equal to 2;

"Alkaline catalyst": 0 to 2, and preferably less than 1, a.o. for the technologic processability and physical properties of the final products, more in particular the mechanical strength;

"Zeolite type catalyst": 0 à 5 and preferably 0 à 3;

"Amine initiators": 1 to 30 and preferably 2 to 10.

It should be noted that the overall concentration of catalysts and amine initiators is dependent on the catalyst combination type, the nature of the used isocyanates and active hydrogen containing compound, the reactive mixture temperature, the mould temperature, etc. . . For a well defined situation, this concentration is however usually higher than for a "RIM" (reaction injection moulding) or "casting" technique, and this in order to guarantee an optimal curing and a limited flow or run off of sprayed thin reaction mixture films.

The possibly used blowing agent may be as well of chemical as of physical nature.

For use as a chemical blowing agent, preference is given to an amount of water between 0 and 0.4% by weight with respect to the total used raw material amount, except for the polyisocyanates, i.e. with respect to said active hydrogen containing compound, cross-linker, chain extender and initiator, an amount lower than 0.1% by weight being preferred.

The amount of used physical blowing agent having a boiling point of 20° à 70° C., is generally comprised between 0 and 0.4% moles with respect to 100 grams of the total amount of active hydrogen containing compound, preference being given to the total omission of a physical blowing agent. The most typical compounds are trichlorofluoromethane and methylene chloride. These physical blowing agents are preferably added to the isocyanate containing component.

In order to guarantee the colour stability of the sprayed polyurethane, the reaction mixture comprises preferably antioxidants and UV absorbers, the following synergic combination being preferred:

a) primary, substituted phenol antioxidants at a concentration which is usually comprised between 0.1 and 1% by weight with respect to the total polyurethane polymer amount;

b) substituted ("hindered") alicyclic amines ("HALS") at a concentration which is generally comprised between 0.1 and 1% by weight of the total polyurethane polymer amount;

c) secondary antioxidants (peroxide decomposition products) consisting of organic phosphites or thioesters at a concentration which is usually comprised between 0 and 5% by weight of the total polyurethane polymer amount;

d) UV absorbers being preferably of the benzotriazole type, generally at a concentration between 0.1 and 1% by weight of the total polyurethane polymer amount.

For colour pigments, use is preferably made of light stable, anorganic and/or organic, solid pigments which are added in the shape of a dispersion in a liquid medium, such as in polyol.

The solid pigment concentration is usually comprised between 1 and 10% by weight with respect to the total polyurethane polymer amount and preferably between 2 and 5% by weight.

In most cases, it is preferred to add an internal release agent to the reaction mixture, preference being given to the polydimethylsiloxane-polyether copolymer types at a concentration lower than 20% by weight polyether with respect to the total molecule and lower than 50% by weight ethylene oxide with respect to the total ethylene oxide and propylene oxide amount in the polyether chain. Such internal release agents do not only facilitate the demolding of the polyurethane films but mostly also reduce the amounts of gas micropores in the film outer surface. External release agents can also be used which are applied as a film on the surface of the mould, which will ensure that the polyurethane is demouldable.

Generally, the release agent concentration comprises between 0 and 3% by weight with respect to the total polyurethane polymer amount, and preferably between 0.5 and 2% by weight.

Another substance which is usually added to the reaction mixture is a neutral, physical, tixotropic thickening agent consisting preferably of fumed, coagulated silicon dioxide, the concentration of which is generally comprised between 0 and 3% by weight of the total polyurethane polymer amount; and preferably between 0.5 and 2% by weight.

For spraying the light stable polyurethane foam with the hereabove described formulation, use is preferably made of a two-components system, wherein one component comprises the isocyanate and all of the additives which are with respect to this isocyanate during a sufficient time period stable and compatible with the latter and wherein the other component comprises the with respect to NCO groups active hydrogen containing component, more in particular polyols and the chain extenders, cross-linkers and initiators, and additives which are with respect to these different compounds during a sufficient time period stable and compatible with the latter.

The first mentioned component comprises thus, in addition to the isocyanate, for example certain antioxidants, UV absorbers, catalysts, internal release agents, plasticizers, fire retardants, physical blowing agents, fillers, thixotropic thickening agents and the like. The second component comprises preferably, in addition to the active hydrogen containing compound, such as polyol, chain extenders and/or cross-linkers, water, pigments and certain catalysts, antioxidants, UV absorbers., water, release agents, plasticizers, fire retardants, fillers, tixotropic thickening agents, etc.

These components are preferably preheated, before the spraying, up to a temperature not higher than 120° and usually between 30° and 70° C., and this in order to speed up the reactivity of the reaction mixture which is sprayed on the mould surface.

The viscosity of the reaction mixture which is sprayed on a mould surface is a very important parameter.

According to the invention, there is aimed at a temperature adjustment of the reaction mixture at spraying in such a way that the viscosity is not higher than 1200 cps and preferably not higher than 700 cps, this in order to obtain an as homogeneous as possible flow of the reaction mixture, and not lower than 200 cps preferably not lower than 500 cps in order to avoid run-off.

For the spraying of the reaction mixture, use is preferably made of a spray pistol working with or without air.

Mostly, use is made of the so-called airless two-components system without solvent.

The mould surfaced the reaction mixture has to be sprayed against for the formation of a polyurethane film, can have very various geometric shapes. The different places of this surface do actually have to be within reach of the movable spray nozzle.

Further, this surface can be of any structure and nature and can be made of metal, plastic, rubber, leather, wood, whether or not provided with a film of an external release agent as generally used in the polyurethane casting and moulding methods.

In order to facilitate the curing of the reaction mixture at the moment it is sprayed on the mould surface, the latter is preferably heated up to a temperature between 30° and 100° and more specifically between 50° and 80° C.

The composition of the reaction mixture and the spray conditions, are preferably selected in such a manner that the films or layers, formed by spraying the reaction mixture on the mould surfaced can be removed from the latter within less than 10 minutes after the spraying and preferably even within less than 3 minutes, and no excessive run-off of the reaction mixture occurs on this surface.

The most typical way for making finished pieces by applying the method according to the invention consists in that in a separate step and in a separate mould, a so-called back-foaming is done with a cellular, flexible to semi-rigid classic polyurethane foam, such as it is customary for the back-foaming of plastic foils.

In a very specific embodiment of the invention, a conventional polyurethane foam (MDI or TDI basis) with a typical mould foamed density of 50 to 600 kg/m$^3$ and a typical free rise density of 30 à 200 kg/m$^3$ is injected, after the spraying of a polyurethane film on a substantially hollow mould surface and before demoulding the latter, by means of a separate injection in the same mould cavity.

Preferably, there is sought to obtain in one single passage of the spray nozzle, a film thickness between 0.3 and 3 mm, thicker layers being however obtainable by spraying a number of different reaction mixture layers upon each other by successive spray nozzle passages.

The density of the obtained polyurethane film, which is preferably micro-cellular, is adapted in an advantageous manner between 500 and 1200 kg/m$^3$ by adjusting the amount of blowing agent, consisting of water and/or of low boiling solvents, and also the amount of air dispersed in the raw materials.

For some applications, it is important to realize a polyurethane layer substantially totally free of pores. This is realized according to the invention by degassing the isocyanate containing component and by degassing and dehydrating the active hydrogen containing component.

The hardness of the polyurethane film, formed on the mould surface, can be adjusted by the choice of the type and amount of the employed isocyanate, polyol, chain extender and/or cross-linker. Preference is given to a hardness between shore A 20 and shore D 80 depending on the applications/requirements of the final PU films.

Finally, reinforcements such as glass fibre mats, can be inbedded in certain parts or in the complete, on the mould surface formed polyurethane film or layer. This can be done before or during the reaction mixture spraying.

Hereafter, a review is given of the abbreviations and codes used in this description and claims.

1. ISOCYANATES

| | |
|---|---|
| I1 = IPDI = | isophorone diisocyanate (Hüls Chemie) |
| = | 3-isocyanatomethyl-3.5.5-trimethylcyclohexyl-isocyanate (37.8% by weight NCO) |
| I2 = TMXDI = | meta- or paratetramethyl xylene diisocyanate (Am.CYANAMID) (34.4% by weight NCO). |
| I3 = HDI = | 1,6-hexamethylene diisocyanate (50% by weight NCO) |
| I4 = H6XDI = | hydrogenated XDI (43% by weight NCO) (TAKEDA CHEM. IND.). |
| I5 = H12MDI | hydrogenated MDI |
| = | DESMODUR W (MOBAY/BAYER) |
| = | dicyclohexylmethane diisocyanate (31.8% by weight NCO) |

Ix-Iy=mixture of isocyanate trimers and isocyanate monomers based on an isocyanate Ix(I1,I2...) having a terminal NCO content=y (percent by weight free NCO groups with respect to the total isocyanate mixture). Ix-Py/z=mixture of isocyanate quasi-prepolymer (with free monomer) based on an isocyanate Ix(I1,I2,...) having a terminal NCO content=y %. The prepolymer being based on the polyol type Z(1,2,3,4)

z=1: dipropylene glycol z=2: trimethylolpropane z=3: glycerin/propylene oxide addition product MW 600 z=4: polypropylene glycol MW 400 (molecular weight: MW)

or on the polyamine type Z(5,6,7)

z=5: a polyamine having the formula:

$$H_2N-CH(CH_3)-CH_2-[O-CH_2-CH(CH_3)]_x-NH_2$$

having a molecular weight of 2000 z=6: a polyamine having the formula:

$$R-HN-C(CH_3)-CH_2-[O-CH_2-CH(CH_3)]_x-NH-R$$

wherein R is isohexyl and which has a molecular weight of 2000 z=7: a polyamine having the formula:

$$R'-NH-CH_2-CH(CH_3)-CH_2-CH_2-NH-R'$$

wherein R' is $$-CH\begin{matrix}CH(CH_3)_2 \\ CH(CH_3)_2\end{matrix}$$

and which has a molecular weight of 313 Ix-Ty:= isocyanurate-trimer (with isocyanate monomer) mixture based on an isocyanate Ix(I1,I2...) having a terminal NCO content=y %.

2. Active hydrogen containing compounds:

P1=addition product of glycerin, propylene oxide and ethylene oxide, having a hydroxyl number of 35, 80% primary OH groups, a molecular weight of 4800 and an equivalent weight of 1600.

P2=addition product of glycerin, propylene oxide and ethylene oxide, having a hydroxyl number of 28, a primary OH group content of 85%, a molecular weight of 6000 and an equivalent weight of 2000.

P3=addition product of diethylene glycol with propylene oxide and ethylene oxide, having a hydroxyl number of 28, a primary OH groups content of 90%, a molecular weight of 4000 and an equivalent weight of 2000.

P4=addition product of pentaerythrol with propylene oxide and ethylene oxide, having a hydroxyl number of 28, a primary OH groups content of 80%, a molecular weight of 8000 and an equivalent weight of 2000.

P5=polytetramethylene oxide glycol (PTMG) having a hydroxyl number of 56, a primary OH groups content of 100%, a molecular weight of 3000 and an equivalent weight of 1500.

P6=an addition product of sorbitol with propylene oxide and ethylene oxide, having a hydroxyl number of 400, a primary OH groups content of 55%, a molecular weight of 840 and an equivalent weight of 140.

P7=addition product of glycerin and propylene oxide and terminal $NH_2$ groups, having a molecular weight of 5000 (Jeffamine T5000-TEXACO).

P8=polycaprolacton ester having a hydroxyl number of 56, a molecular weight of 2000 and an equivalent weight of 1000.

P9=polycondensate ester between diethylene glycol and adipic acid, having a hydroxyl number of 56, a molecular weight of 2000 and an equivalent weight of 1000.

P10=DURACARB 124 (PPG Industries Inc.-USA)= polycarbonate diol having an $I_{OH}$ number of 60.

3. Chain extenders, cross-linkers and amine initiators

MEG=monoethylene glycol

DEG=diethylene glycol

BD=1,4-butanediol

TMP=trimethylolpropane (or possibly a liquid addition product of TMP with 1 mole ethylene oxide)

TEOA=triethanolamine

DEOA=diethanolamine

MEOA=monoethanolamine

CD400=Jeffamine CD400 (TEXACO)=addition product of a diol initiator, with propylene oxide and terminal secondary NH groups, having a molecular weight of 400 and an equivalent weight of 200.

EDA=ethylenediamine

Quadrol=addition product of ethylendiamine and 4 moles PO

IPDA=isophorondiamine
AEPD=2-amino-2-ethyl-1,3-propanediol
AMP=2-amino-2-methyl-1-propanol
a2=a polyamine having the formula:

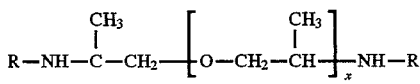

wherein R is isohexyl and which has a molecular weight of 200 (equivalent weight=100) b4=a polyamine having the formula:

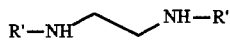

wherein R' is

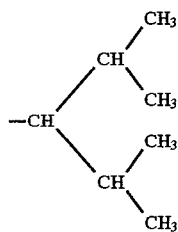

and which has a molecular weight of 256 (equivalent weight=128).

4. Catalysts (except for amine initiators)
   a) Organolead catalysts (LC)
   LC1=lead-2-ethylhexoate
   LC2=lead-naphthenate
   b) Organobismuth catalysts (BC)
   BC1=bismuth-(III)-2-ethylhexoate
   BC2=bismuth-(III)-naphthenate
   c) Organotin catalysts (TC)
   TC1=dimethyltindineodecanoate
   TC2=dibutyltindiacetate
   TC3=tetrabutyltindistanoxane dilaurate
   TC4=dibutyltin dichloride
   d) Alkaline catalysts (AC)
   AC1=1,8-diazabicyclo (5,4,0) undecene-7-phenolate
   AC2=idem AC1, but octoate salt
   AC3=potassium octoate
   AC4=sodium phenolate
   e) Zeolite type catalysts (ZC)
   ZC1=sodium aluminium silicate—3 Angström (powder)
   ZC2=potassium aluminium silicate—4 Angström (50% powder, spread as a paste in ricinus oil)

5. Various additives
   a) Antioxidizers/UV absorbers (AO/UV)
   A mixture of antioxidants and UV absorbers consisting in percent by weight of:
   40% trisphenylphosphite
   20% 2-(2-hydroxy-3,5-di tert.amyl-phenyl)-2H-benzotriazole
   20% pentaerythrityl-tetrakis [3-(3,5-di tert.butyl-4-hydroxyphenol)propionate]
   20% di-sebacate ester of 4-hydroxy-2,2,6,6,-tetramethylpiperidine
   b) Tixotropic agents
   A200=Aerosil 200 (DEGUSSA-Germany) Coagulated, fumed silicon dioxide having an active surface of 200 m$^2$/gr and a grain size of about 12μ.

c) Colour pigment (concentrated dispersion in a P1 type active hydrogen containing compound).
A mixture(in the proportions 1:1:1) of:
titanium dioxide (white)
copper phthalocyanine (blue)
di-azo condensate (red)
The concentrations given in the formulations relate to the solid pigments.

d) Internal release agent (IRA)
This release agent is based on a silicon, more in particular of the type polydimethylsiloxane-polyether copolymer having 90% by weight siloxane and 10% by weight polyether groups, the polyether chain containing 20% ethylene oxide and 80% propylene oxide units arid the terminal groups being OH groups.

6) Kinetic process parameters
a) FT: fibre forming time "fibre time" (expressed in seconds), indicates the beginning of the gelling, i.e. the moment on which a fibre can be drawn of the reaction mixture for example by means of a glass rod. This constitutes a measure for the pot-life.

b) TFT: "tac free time" (expressed in seconds) is the time at which the surface skin becomes substantially dry, i.e. not any more sticky.

c) DT: "demoulding time" (expressed in seconds) indicates the time at which the obtained film can be removed from the mould surface without problems, i.e. without sticking, deformation, etc.

d) run off: is a measure for the tendency of the reaction mixture, sprayed on the mould surface, to run off (at a too low viscosity build up) from a higher mould surface level to a lower level.
The visual codes thereof are as follows:
Code 0: no "run off" (=ideal situation)
Code 1: tendency to run off (still satisfying)
Code 2: a slight run off (acceptable limit)
Code 3 and higher: more definite run off (not acceptable) resulting in too large thickness variations of the sprayed film.

7. Properties of the spayed films:
D: apparent density (gr/cm$^3$)
ER: elongation at rupture (%)—ASTM D412
RR: tensile strength at rupture (MPa)—ASTM D412
TR: tear resistance in N/cm—ASTM D624
Shore A (D): surface hardness—ASTM D2240
WOM: weatherometer test (accelerated light/heat aging test) under the following test conditions (ATLAS E525 apparatus)
xenon radiation source
black panel temperature 88° C.
cycle: 3.8 hours light/1 hour dark (no direct water spray on samples)
test duration: 1000 hours.
In each of the examined cases, substantially no discouloration ($\Delta E<1.5$) or gloss variation (gloss retention >70% with respect to the original gloss degree before the WOM test) has been determined.
Internal codes relating to the visual degradation of the examined polyurethane film surface (cracks, brittleness):
code 0: completely satisfying
code 1: tendency to cracks in surface (only microscopically visible)
code 2: small cracks in surface
code 3 and higher: moderate to strong cracks (not acceptable).
The mention "OK" for the visual appearance indicates that no visual defects concerning the micro porous skin structure, excessive gas bubbles, colour streak formation or gloss differences in the surface of the sprayed film, have been observed.

The following Table 5 shows some specific examples of specific embodiments of the method according to the invention. Of these specific examples, Examples 1–20 and 21–25 are hypothetical Examples; however, we expect that they will permit the results of the present invention to be achieved, if these specific examples are practiced. The properties of the spray films and kinetic process parameters represent our estimation of what may be achieved.

In these tables, the hereabove defined abbreviations and codes are thus used.

Further, the technology processing conditions are in these examples the following ones:

high pressure, two components spray unit (with spray pistol)

raw materials temperature: 60° C.

metal mould surface temperature: 60° C.

total output of components: 20 gr/sec.

sprayed film thickness: about 2 mm

TABLE 5

| Example n° | 1 | 2 | 3 | 4 | 5 |
|---|---|---|---|---|---|
| act. H compound (basic polyol) | P1 : 100 | P2 : 100 | P3 : 100 | P7 : 100 | P9 : 100 |
| isocyanate | I1 - P28/1 | I1 - T30 | I1 - T27 | I1 - P26/4 | I1 - P27/3 |
| NCO index | 105 | 95 | 100 | 95 | 90 |
| catalyst system (excluded amine initiators) | LC1 : 0,5 AC4 : 0,8 | LC2 : 0,4 AC1 : 1 TC3 : 0,5 | BC1 : 0,5 ZC1 : 1 | LC1 : 0,4 | BC2 : 0,5 TC1 : 0,5 |
| chain ext./ crosslinker (+ amine initiators) | DEG : 8 AMP : 5 | MEG : 5 CD400 : 6 | TMP : 3 quadrol : 2 DEOA : 4 | MEG : 7 AEPD : 2 | BD : 6 IPDA : 6 |
| various |  |  |  |  |  |
| AO/UV | 2 | → | → | → | → |
| water | 0,05 | 0,05 | 0,08 | 0,06 | 0,07 |
| tixo tropic add. | 2 | 1,5 | 1,5 | 1 | 1 |
| color pigment | 5 | → | → | → | → |
| IRA | 2 | → | → | → | → |
| PROCESS PA. |  |  |  |  |  |
| FT (sec) | 8 | 6 | 12 | 7 | 10 |
| TFT (sec) | 30 | 25 | 55 | 30 | 35 |
| DT (sec) | 120 | 90 | 150 | 60 | 120 |
| run off (code) | 1 | 0/1 | 1 | 0 | 0/1 |
| visual Properties PU | OK | → | → | → | → |
| D | 0,92 | 0,95 | 0,88 | 0,90 | 0,94 |
| ER | 205 | 180 | 215 | 200 | 250 |
| RR | 4 | 6 | 8 | 7 | 9 |
| TR | 290 | 350 | 330 | 370 | 410 |
| Shore A(D) | 64A | 52A | 57A | 54A | 70A |
| WOM test 1000 h(code) | 0/1 | 1 | 1/2 | 0/1 | 1 |

| Example n° | 6 | 7 | 8 | 9 | 10 |
|---|---|---|---|---|---|
| act. H compound (basic pol.) | P1 : 100 | P4 : 100 | P8 : 100 | P5 : 100 | P1 : 100 |
| isocyanate | I1 - T27 | I2 - P26/2 | I3 - B30 | I3 - T30 | I4 - P32/3 |
| NCO index | 100 | 100 | → | → | → |
| catalyst system (excluded amine initiators) | LC1 : 0,3 AC1 : 0,3 TC1 : 1 | LC1 : 0,4 AC1 : 1,3 TC1 : 0,3 | BC1 : 1 | LC1 : 0,3 ZC2 : 0,9 | BC1 : 0,5 TC4 : 0,3 |
| chain ext./ crosslinker (+ amine initiators) | MEG : 3 b4 : 12 | MEG : 4 TMP : 4 DEOA : 6 | DEG : 5 TEOA : 2 AMP : 6 | DEG : 5 TEOA : 2 AMP : 6 | BD : 8 DEOA : 8 |
| various |  |  |  |  |  |
| AO/UV | 2 | 4 | 3 | 3 | 2 |
| water | 0,05 | 0,09 | 0,05 | 0,03 | 0,04 |
| tixo tropic addi. | 1,5 | 1,5 | 1,8 | 1,6 | 1,4 |
| color pigment | 5 | 5 | → | → | → |
| IRA | 2 | 2 | → | → | → |
| PROCESS PA. |  |  |  |  |  |
| FT (sec) | 8 | 10 | 9 | 9 | 8 |
| TFT (sec) | 35 | 40 | 35 | 30 | 35 |
| DT (sec) | 150 | 90 | 120 | 90 | 120 |
| run off (code) | 0/1 | 0/1 | 0/1 | 0/1 | 0/1 |
| visual Properties PU | OK | OK | → | → | → |
| D | 0,90 | 0,83 | 0,91 | 1,05 | 0,96 |
| ER | 330 | 210 | 170 | 180 | 190 |
| RR | 9 | 7 | 4 | 4 | 5 |
| TR | 390 | 400 | 240 | 250 | 310 |
| Shore A(D) | 71A | 61A | 70A | 63A | 65A |
| WOM test 1000 h(code) | 1 | 1 | 1 | 1 | 0/1 |

| Example n° | 11 | 12 | 13 | 14 | 15 |
|---|---|---|---|---|---|
| act. H compound (basic polyol | P1 : 100 | P1 : 100 | P7 : 100 | P1 : 100 | P10 : 100 |
| isocyanate | I5 - P22/4 | I1 - P2615 | I2 - P26/6 | I3 - P30/5 | I3 - P35/7 |
| NCO index | 100 | 100 | 100 | 100 | 100 |
| catalyst system (excluded amine initiators) | LC2 : 0,5 AC3 : 1,5 | LC1 : 0,3 AC1 : 0,5 TC3 : 0,3 | LC1 : 0,3 AC1 : 0,2 | TC1 : 0,5 | TC2 : 0,5 |
| chain ext./ crosslinker (+ amine initiators) | BD : 10 AEPD : 5 | MEG : 8 DEOA : 4 | TMP : 10 DEOA : 5 | BD : 12 O2 : 4 | BD : 8 b4 : 8 |
| various |  |  |  |  |  |
| AO/UV | 2 | 3 | 3 | 3 | 3 |
| water | 0,04 | 0,05 | 0,03 | 0,03 | 0,04 |
| tixotropic add. | 1,2 | 1,5 | 1,0 | 1,5 | 1,5 |
| color pigment | 5 | 5 | 5 | 5 | 5 |
| IRA | 2 | 2 | 2 | 2 | 2 |
| PROCESS PA. |  |  |  |  |  |
| FT (sec) | 12 | 11 | 9 | 10 | 10 |
| TFT (sec) | 35 | 35 | 35 | 35 | 35 |
| DT (sec) | 120 | 100 | 90 | 100 | 100 |
| run off (code) | 1 | 0/1 | 0 | 0/1 | 0/1 |
| visual Properties PU |  |  |  |  |  |
| D | 0,95 | 0,88 | 0,92 | 0,90 | 0,86 |
| ER | 250 | 240 | 260 | 270 | 300 |
| RR | 6 | 7 | 8 | 7 | 7 |
| TR | 370 | 340 | 350 | 390 | 420 |

TABLE 5-continued

| Shore A(D) | 58A | 61A | 60A | 70A | 75A |
|---|---|---|---|---|---|
| WOM test 1000 h(code) | 1 | 1 | 1 | 1 | 1 |

| Example N° | 16 | 17 | 18 | 19 | 20 |
|---|---|---|---|---|---|
| act. H compound (basic pol.) | P1 : 100 | P7 : 100 | P1 : 100 | P1 : 100 | P6 : 100 |
| isocyanate | I1 - T28 | I1 - P28/1 | I2 - P26/2 | I1 - T30 | I1 - T30 |
| NCO index | 105 | 105 | 110 | 105 | 105 |
| catalyst system (excluded amine initiators) | TC1 : 2<br>AC1 : 0,5 | TC3 : 1<br>ZC2 : 0,5 | LK1 : 0,5<br>TC1 : 1 | TC2 : 1,0<br>AC2 : 0,5 | TC2 : 1,2<br>AC3 : 0,7 |
| chain exten./ crosslinker (+ amine initiators) various | MEG : 10<br>AEPD : 8 | BD : 25<br>CD400 : 6 | TMP : 15<br>DEOA : 6 | TMP: 60<br>quadrol : 20<br>EPDA : 4 | MEG : 6<br>TEOA : 3<br>DEOA : 4 |
| AO/UV | 2 | → | → | → | → |
| water | 0,04 | 0,02 | 0,10 | 0,30 | 0,25 |
| tixo tropic add. | 1,0 | 0,9 | 0,9 | 0,9 | 0,9 |
| color pigment | 5 | → | → | → | → |
| IRA | 3<br>0 | →<br>0 | →<br>0 | →<br>4 | →<br>0 |
| PROCESS PAR. | | | | | |
| FT (sec) | 10 | 8 | 8 | 6 | 8 |
| TFT (sec) | 35 | 25 | 30 | 25 | 30 |
| DT (sec) | 90 | 60 | 75 | 60 | 75 |
| run off (code) | 1 | 0 | 0/1 | 0 | 0/1 |
| visual Properties PU | OK | → | → | → | → |
| D | 0,91 | 1,02 | 0,85 | 0,60 | 0,77 |
| ER | 185 | 240 | 210 | 10 | 12 |
| RR | 12 | 15 | 14 | 23 | 31 |
| TR | 410 | 530 | 605 | NA | NA |
| Shore A(D) | 80A | 82A | 45D | 78D | 80D |
| WOM test 1000 h(code) | 0/1 | 0/1 | 1 | 0/1 | 0 |

From the examples 21 to 25 following hereinafter in Table 6, it can be deducted that if one or more catalysts or initiators are deleted or if their concentration is strongly reduced, the reactivity is reduced too fast thereby arising a too critical run off of the reaction mixture and a too slow curing of the spayed film.

In the examples 21 to 25 of Table 6, the same formulations as in example 1 are repeated, however the catalysts and initiators amount being reduced as shown in the Table.

TABLE 6

| Example n° | concentration (pph) | | | FT (sec) | TFT (sec) | DT (sec) | RUN OFF (CODE) | VISUAL APPEARANCE |
|---|---|---|---|---|---|---|---|---|
| | LC1 | AC4 | AMP | | | | | |
| 1 | 0,5 | 0,8 | 5 | 8 | 30 | 120 | 1 | OK |
| 21 | 0,5 | 0 | 5 | 30 | 120 | 360 | 1–2 | OK |
| 22 | 0,25 | 0,4 | 5 | 25 | 120 | 300 | 2 | OK |
| 23 | 0,25 | 0,4 | 2,5 | 35 | 180 | 420 | 3 | OK limit |
| 24 | 0 | 1,5 | 5 | 120 | 600 | +/−1 h | >>3 | unacceptable |
| 25 | 0,5 | 0,8 | 0 | 180 | 600 | +/−1 h | >>3 | unacceptable |

In the above examples, advantageously an external release wax emulsion which is known as such is sprayed onto the mould surface prior to spraying the polyurethane mixture.

What is claimed is:

1. A method for making a light stable substantially non-cellular polyurethane layer or film by spraying a multiple component polyurethane system by means of a spray gun on a mold surface coated with an external release agent and kept at a temperature of 30° to 100° C., allowing the sprayed polyurethane to cure on the mold surface and demolding the obtained polyurethane layer or film, said polyurethane system being preheated before spraying to an application temperature not higher than 120° C. and having an initial viscosity of 200 to 1200 cps at application temperature, a fibre forming time, FT, greater than 3 seconds, and a demolding time, DT, less than 10 minutes, wherein an isocyanate, having at least two NCO groups which are not directly attached to an aromatic group and an NCO value of at least 15% by weight, is reacted with a compound containing active hydrogen with respect to NCO groups, in the presence of a chain extender and/or cross-linker, and in the further presence of a thixotropic thickening agent wherein the compound containing active hydrogen comprises functional groups which consist of at least 50% of active $CH_2OH$, NH and/or $NH_2$ groups, and has a functionality which varies from 2 to 8 and an equivalent weight between 100 and 3500, but excluding caprolactone polyols having a terminal hydroxyl number higher than 200, together with 2 to 300 parts, per 100 parts of said compound, of a chain extender and/or a cross-linker, the functional groups of which are OH groups, at least 50% of which are primary OH groups, and which has an equivalent weight less than 100 and a functionality which varies from 2 to 6, wherein said reacting is catalyzed with a catalytic system which comprises:

1) at least an organic lead compound of one of the following groups:
   a) organolead (II) salts of carboxylic acids, containing at least one carboxylic group;
   b) lead dithiocarbamates having the formula:

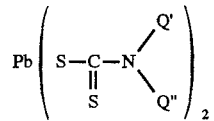

wherein Q' and Q" are different or the same and represent an alkyl group with 1–20 carbon atoms;
   c) organolead (IV) compounds having the formula $PbQ_4'''$, wherein Q''' represents an alkyl group with 1–6 carbon atoms; and d) lead (II) acetylacetonate; and/or 2) at least an organic bismuth compound of the following general formula:

$$(R_1)_k-(Bi)_p-(Z)_q-Bi-(R_1)_n$$
$$\quad\quad\quad |\quad\quad\quad\quad |$$
$$\quad\quad\quad (Y)_j\quad\quad\quad (Y)_m$$

wherein:

p=q=0 or 1 k+j=2 or 4 when p=q=1 or k=j=0 when p=q=0 m+n=3 or 5 when k=j=p=q=0 or m+n=2 or 4 when p=q=1 m+n≠0, m or n may be equal to 0 but are not, however, simultaneously equal to 0;

$R_1$ is a $C_1$–$C_{12}$ alkyl radical which is substituted or not substituted, a phenyl radical, a $C_5$–$C_6$ cycloalkyl radical or a halogen atom;

Z represents oxygen or sulfur;

Y is a halogen atom, a —O—CO—$R_2$, —$OR_2$, —$SR_2$, $$\diagdown_{O}\diagdown\quad\diagdown_{S}\diagdown\quad\quad\quad\diagup^{R_2}$$
$$\quad\diagup^{R_3}\quad\diagup^{R_3}\quad\text{or}\quad-N$$
$$\diagup_{O}\diagup\quad\diagup_{S}\diagup\quad\quad\quad\diagdown_{R_2}$$

group wherein $R_2$ represents (1) a $C_1$–$C_{20}$ alkyl radical, a $C_2$–$C_{20}$ alkenyl radical, a $C_5$ or $C_5$ cycloalkyl radical, a phenyl radical, a benzyl radical, which are unsubstituted or substituted by one or more $C_1$–$C_{12}$ alkyl or $C_2$–$C_{12}$ alkenyl radicals, one or more halogen atoms, one or more hydroxy, —OR, —N(R)$_2$ or —SR radicals, or (2) a phenyl radical which is substituted by one or more CHO, —CO—R or COOR groups, R being a $C_1$–$C_{12}$ alkyl, $C_2$–$C_{12}$ alkenyl, $C_5$–$C_6$ cycloalkyl, phenyl, or benzyl radical, which is unsubstituted or substituted by one or more $C_1$–$C_{12}$ alkyl or $C_2$–$C_{12}$ alkenyl radicals, one or more halogen atoms, or hydroxy radicals, and $R_3$ is a (—$CR_4R_5$)$_x$ group wherein x=2 or 3 and $R_4$ and $R_5$=H, $CH_3$ or $C_2H_5$, and/or at least an organic tin (IV) compound of one of the following groups:

a) Sn (IV) carboxylates having the following general formula:

$$R_1\diagdown\quad\diagup O-C-R_2$$
$$\quad\quad Sn\quad\quad\quad ||$$
$$\quad\quad\quad\quad\quad\quad O$$
$$R_1\diagup\quad\diagdown O-C-R_2$$
$$\quad\quad\quad\quad\quad\quad ||$$
$$\quad\quad\quad\quad\quad\quad O$$

wherein $R_1$ is a $C_1$–$C_4$ alkyl radical and $R_2$ forms a $C_1$–$C_{12}$ alkyl radical or a naphthenic acid radical, the alkyl radicals being linear or branched;

b) dialkyldistannoxane dicarboxylates having the following general formula:

$$R_1\diagdown\quad\quad\quad\quad\quad\quad R_1$$
$$\quad\quad Sn-O-Sn$$
$$\diagup\quad |\quad\quad\quad\quad |\quad\diagdown$$
$$R_1\quad OCOR'\quad\quad R_1$$
$$\quad\quad\quad\quad\quad\quad |$$
$$\quad\quad\quad\quad\quad\quad OCOR'$$

wherein $R_1$ is a $C_1$–$C_4$ alkyl radical and R' is a $C_1$–$C_{12}$ branched or unbranched alkyl radical;

c) alkyltin halides having the following general formula:

$(R_1)_x Sn(Hal)_y$ wherein $R_1$ is a $C_1$–$C_4$ alkyl radical, Hal is a halogen, x+y=4 and x or y varies from 1 to 3;

said organic lead, and/or bismuth and/or tin (IV) compound being combined with at least an amine initiator, having a functionality of 2 to 6, an equivalent weight lower than or equal to 200, and at least one aliphatic $NH_2$ or NH group.

2. A method as claimed in claim 1, wherein at the most 0.4% of water is added with respect to 100 grams of said active hydrogen containing compound, cross-linker, chain extender and initiator.

3. A method as claimed in claim 1, wherein an isocyanate is used consisting mainly of IPDI monomer and/or a mixture of IPDI monomer and IPDI derivatives, such as trimers, especially isocyanurate or biuret trimers, prepolymers and/or carbodiimide/urethidion derivatives, in such ratio's which allow to obtain a NCO value of 15 to 37.8% by weight.

4. A method as claimed in claim 1, wherein an isocyanate is used consisting mainly of TMXDI monomer, (with meta and/or para isomer), prepolymers, biuret trimer and/or carbodiimide/urethidion derivatives, in such ratio's which allow to obtain a NCO value of 15 to 34.4 in % by weight.

5. A method as claimed in claim 1, wherein use is made of an isocyanate consisting mainly of HDI in a ratio to provide a NCO value of 15 to 50 in % by weight.

6. A method as claimed in claim 1, wherein an isocyanate is used consisting mainly of H6XDI in a ratio to provide a NCO value of 15 to 43 in % by weight.

7. A method as claimed in claim 1, wherein the isocyanate is used consisting mainly of H12MDI in a ratio to provide a NCO value of 15 to 31.8 in % by weight.

8. A method as claimed in anyone of claim 3 to 7, wherein prepolymers based on polyetherpolyols, chain extenders and/or cross-linkers having as functional groups only OH (primary and/or secondary), a functionality of 2 to 6 and a hydroxyl number of 15 to 1800, are used.

9. A method as claimed in claim 1, wherein use is made of an active hydrogen containing compound, consisting mainly of polyether alcohols which are formed by a polyaddition of propylene oxide and/or ethylene oxide on low molecular initiators.

10. A method as claimed in claim 1, wherein use is made of an active hydrogen containing compound which comprises polyester alcohols consisting of ester condensation products of dicarboxylic acids with low molecular polyalcohols having a functionality of 2 to 4.

11. A method as claimed in claim 1, wherein use is made of an active hydrogen containing compound consisting mainly of polycaprolactone esters with terminal primary OH groups.

12. A method as claimed in claim 1, wherein use is made of an active hydrogen containing compound consisting mainly of polytetramethylene ether glycols (PTMG).

13. A method as claimed in claim 1, wherein use is made of an active hydrogen containing compound consisting mainly of polyetherpolyols having a functionality of 2 to 3, a hydroxyl number of 15 to 200, and which are possibly modified with polymerized organic fillers, such as polyols grafted with styrene/acrylonitrile, PHD polyols and PIPA polyols, with a filler content varying from 0 to 50% by weight.

14. A method as claimed in claim 1, wherein use is made of an active hydrogen containing compound consisting mainly of polyols having at least 70% primary OH groups.

15. A method as claimed in claim 1, wherein use is made of a chain extender and/or cross-linker consisting mainly of at least one of following substances:

ethylene glycol, propanediol, triethanolamine, butanediol, pentanediol, hexanediol, glycerin, trimethylpropane, trimethylolethane, pentaerythrol, bisphenol A, cyclohexanedimethanol, and ethylene oxide addition products of these substances with less than 5 moles ethylene oxide per mole of said substances.

16. A method as claimed in claim 1, wherein use is made of an amine initiator comprising at least one of following compounds:

monoethanolamine, diethanolamine, diisopropanolamine, ethylenediamine, isophoronediamine, N,N'-dimethyl (diethyl)-ethylenediamine, 2-amino-2-methyl(or ethyl)-1- propanol, 2-amino-1-butanol, 3-amino-1,2-propanediol, 2-amino-2-methyl(ethyl)-1,3-propanediol "Jeffamines" (Texaco) (propylene oxide addition products having mainly terminal primary $NH_2$ or secondary NH groups—functionality 2 à 3—equivalent weight <200).

17. A method as claimed in claim 1, wherein an internal release agent is added to the reaction mixture so as to provide a concentration of said release agent varying between 0 and 5% by weight with respect to the total polyurethane polymer amount.

18. A method as claimed in claim 1, wherein the thixotropic thickening agent consists of fumed coagulated silicon dioxide.

19. A method for preparing the light stable polyurethane prepared according to claim 1, wherein use is made of a two component system, wherein one component comprises said isocyanate and wherein another component comprises said compounds containing active hydrogen with respect to NCO groups, chain extenders and cross-linkers.

20. A method as claimed in claim 19, wherein said components are preheated up to a temperature between 30° and 70° C. before spraying.

21. A method as claimed in claim 19, wherein the temperature of said polyurethane reaction mixture is adjusted at spraying in such a manner said polyurethane reaction mixture has a viscosity not higher than 700 cps.

22. A method as claimed in claim 19, wherein said polyurethane is sprayed on a surface which is kept at a temperature of 50° to 80° C.

23. A method as claimed in claim 19, wherein a sprayed polyurethane layer is prepared with a density between 500 and 1200 kg/m$^3$ by adapting the amount of blowing agent and dispersed air in the raw materials.

24. A method as claimed in claim 19, wherein a polyurethane layer, substantially free of pores and having a density of 900 to 1200 kg/m$^3$ is formed by degassing and dehydrating before spraying, at least said component comprising said active hydrogen containing compound.

25. A method as claimed in claim 19, wherein the type and the amount of said isocyanate, said active hydrogen containing compound, said chain extender and/or said cross-linker are selected so as to prepare a sprayed polyurethane layer having a hardness between shore A 20 and shore D 80.

26. A method as claimed in claim 5, wherein said HDI comprises HDI monomer.

27. A method as claimed in claim 5, wherein said HDI comprises HDI derivatives.

28. A method as claimed in claim 27, wherein said HDI derivatives comprise one or members selected from the group consisting of trimers, prepolymers, and carbodiimide/ urethidion derivatives.

29. A method as claimed in claim 28, wherein said trimers are selected from the group consisting of isocyanurate or biuret trimers.

30. A method as claimed in claim 6, wherein said H6XDI comprises H6XDI monomer.

31. A method as claimed in claim 6, wherein said H6XDI comprises H6XDI derivatives.

32. A method as claimed in claim 31, wherein said H6XDI derivatives comprise one or members selected from the group consisting of trimers, prepolymers, and carbodiimide/ urethidion derivatives.

33. A method as claimed in claim 34, wherein said trimers are selected from the group consisting of isocyanurate or biuret trimers.

34. A method as claimed in claim 7, wherein said H12MDI comprises H12MDI monomer.

35. A method as claimed in claim 7, wherein said H12MDI comprises H12MDI derivatives.

36. A method as claimed in claim 35, wherein said H12MDI comprises one or members selected from the group consisting of trimers, prepolymers, and carbodiimide/ urethidion derivatives.

37. A method as claimed in claim 36, wherein said trimers are selected from the group consisting of isocyanurate or biuret trimers.

38. A method as claimed in claim 17, wherein said internal release agent consists of a polydimethylsiloxane-polyether copolymer having less than 20% by weight of polyether with respect to the total molecule and less than 50% by weight ethylene oxide with respect to the sum of ethylene oxide and propylene oxide in the polyether chain.

39. A method as claimed in claim 18, wherein said fumed coagulated silicon dioxide is used at a concentration between 0 and 3% by weight with respect to the total polyurethane amount.

40. A method according to claim 1, wherein the catalytic system comprises:
1) at least an organic lead compound from:
   an organolead (II) salt of a carboxylic acid and/or
2) at least a three valency bismuth salt of a carboxylic acid, and/or
3) at least an organic tin (IV) compound from:
   Sn(IV) carboxylates having the formula 3)a), wherein $R_1$ is a methyl group and $R_2$ a $C_7$–$C_{11}$ alkyl radical or a naphthenic acid radical, or wherein $R_1$ is a butyl group and $R_2$ is a $C_1$–$C_4$ alkyl radical.

41. A method according to claim 1, wherein when Y is halogen, it is Cl, Br, F or I; when $R_2$ is substituted with one or more halogen atoms, the halogen atoms are Cl, Br, F or I; and Hal is chlorine or bromine.

42. A method according to claim 40, wherein said carboxylic acid of said organolead (II) salt or said carboxylic acid of said at least a three valency bismuth salt of a carboxylic acid is lead acetate, adipate, citrate, 2-ethylhexoate, laurate, linoleate, naphthenate, octanoate, oleate, oxalate, palmitate, resinate, ricinoleate, salicylate, stearate, tallate or tartrate.

43. A method as claimed in claim 1, wherein said catalytic system comprises said amine initiator and at least one of said organolead compound, said organic bismuth compound or said organic tin (IV) compound, in combination with a zeolite catalyst formed of an alkaline aluminum silicate with sodium and/or potassium ions and/or (B) an alkaline catalyst having a pH greater than 10 and consisting of diazobicycloalkenes or salts of diazobicycloalkenes with weak organic acids or consisting of potassium, sodium or lithium salts of weak organic acids.

* * * * *